No. 698,960. Patented Apr. 29, 1902.
J. R. JONES.
PULVERIZER.
(Application filed Aug. 27, 1901.)
(No Model.) 3 Sheets—Sheet 1.
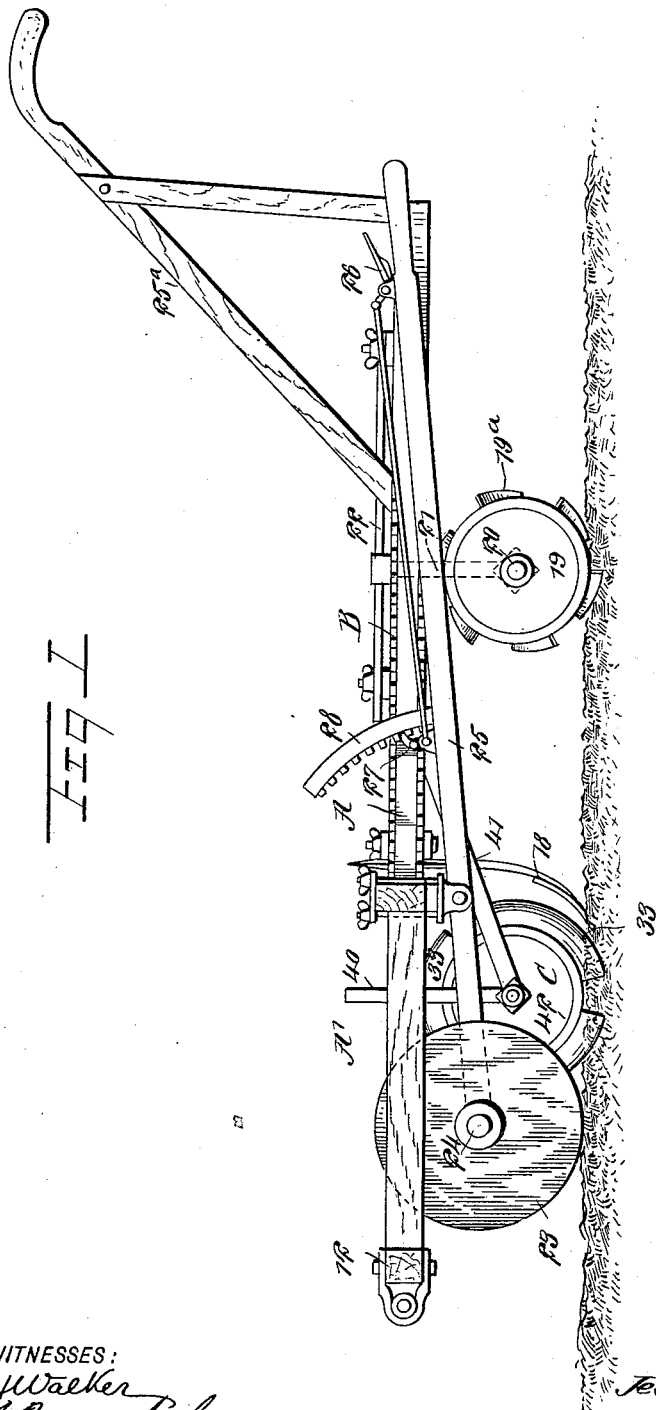
WITNESSES:
INVENTOR
Jesse R. Jones.
BY 
ATTORNEYS
THE NORRIS PETERS CO., PHOTO-LITHO., WASHINGTON, D. C.

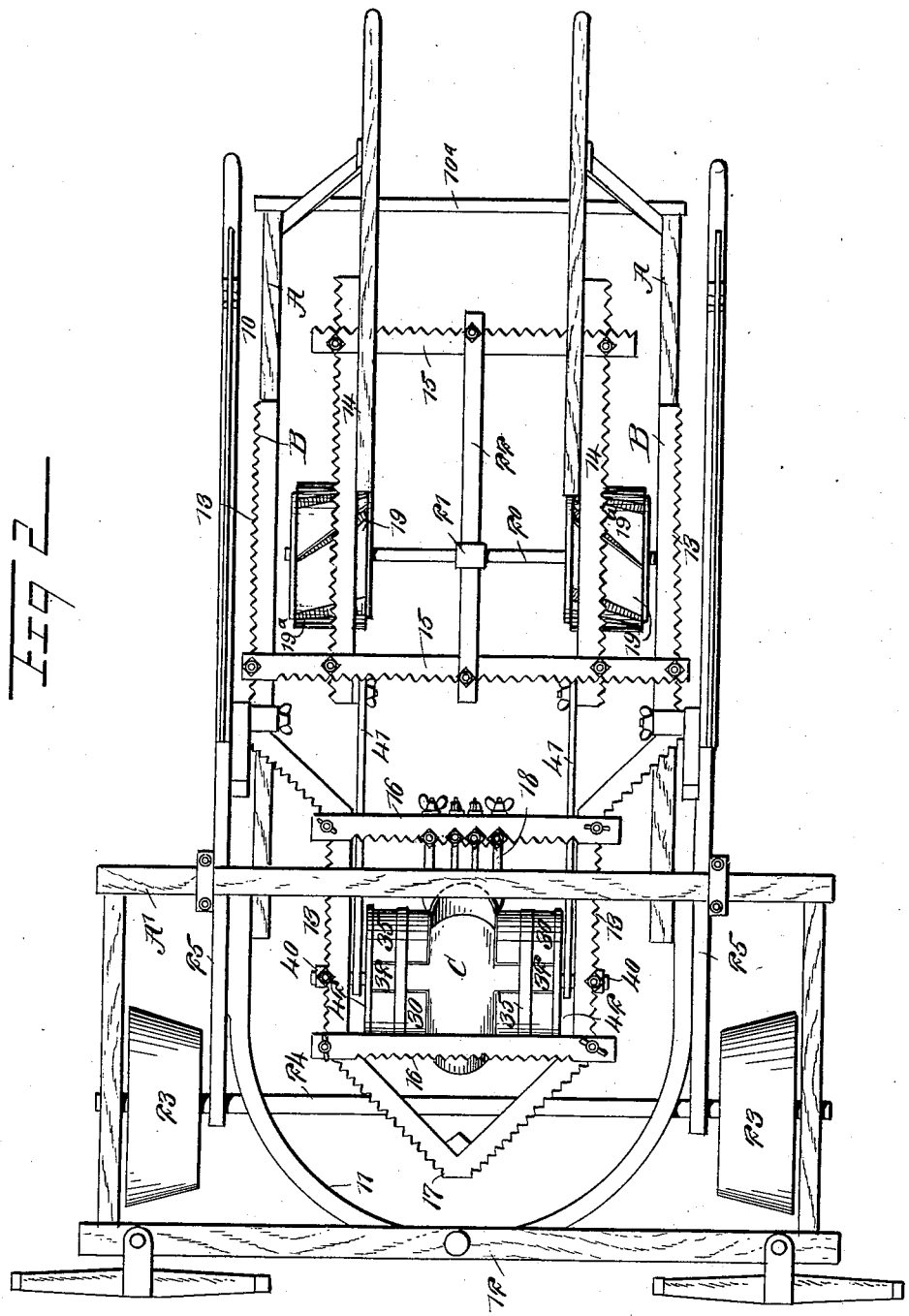

No. 698,960. Patented Apr. 29, 1902.
J. R. JONES.
PULVERIZER.
(Application filed Aug. 27, 1901.)
(No Model.) 3 Sheets—Sheet 3.
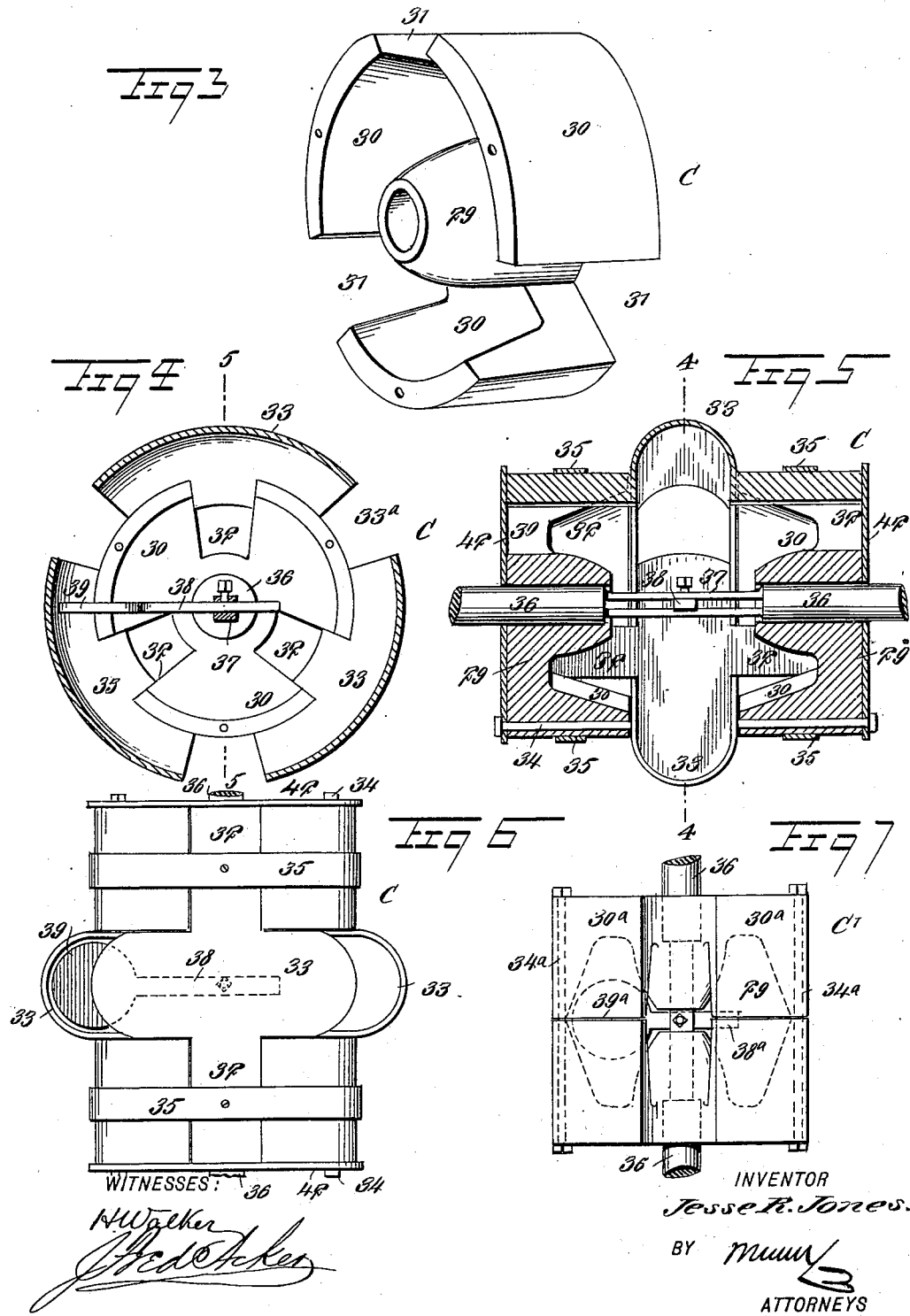
WITNESSES:
H. W. Walker
J. Fred Acker
INVENTOR
Jesse R. Jones.
BY
ATTORNEYS

UNITED STATES PATENT OFFICE.

JESSE RUBLE JONES, OF JACKSON, MISSISSIPPI.

PULVERIZER.

SPECIFICATION forming part of Letters Patent No. 698,960, dated April 29, 1902.

Application filed August 27, 1901. Serial No. 73,427. (No model.)

To all whom it may concern:

Be it known that I, JESSE RUBLE JONES, a citizen of the United States, and a resident of Jackson, in the county of Hinds and State of Mississippi, have invented a new and Improved Pulverizer, of which the following is a full, clear, and exact description.

The design of the invention is to provide a suitable roller for mashing and smoothing the soil, adapted to the greatest variety of purposes, and to so construct the roller or pulverizer that it may mash down plants that are to be destroyed by being covered up by cultivating teeth, shares, or knives which follow, and which leaves such plants as are desired to remain and the soil in the best cultivatable condition.

A further purpose of the invention is to provide an effective pulverizer of simple, durable, and economic construction adapted to operate alone in front of or in connection with plows, shovels, or circular knives.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of an implement having the improvement applied. Fig. 2 is a plan view of the implement and the improved pulverizer. Fig. 3 is a perspective view of a member of the body portion of the pulverizer. Fig. 4 is a transverse section taken on the line 4 4 of Fig. 5. Fig. 5 is a longitudinal section taken on the line 5 5 of Fig. 4. Fig. 6 is a detail plan view of the pulverizer, and Fig. 7 is a plan view of a pulverizer differing slightly in construction from that shown in the other views.

A represents the frame of an agricultural implement, to which the improvement is shown applied, which frame consists of side bars 10, connected at the back by a cross-bar 10$^a$. At the front an extension A' of the main frame is provided, and where the two frames A and A' connect a forwardly-extending bow-section 11 is provided, upon which the draft device 12 is pivoted. In addition to the main frame A and its extension A', I have also shown a toothed frame B, supported by the main frame and its extension. This toothed frame consists of outer side bars 13, inner side bars 14, and rear cross-bars 15, together with forward cross-bars 16 and a triangular section 17. The frame B is adapted to receive and hold the shanks 18 of cultivator blades, teeth, plows, or shovels.

The rear portion of the implement is supported by ground-wheels or pulverizing attachments 19, carried by an axle 20, and this axle is shown as journaled in an upright 21, carried by a longitudinal bar 22, extending from one cross-bar 15 of the toothed frame to the other. The wheels 19 are provided with knives 19$^a$, which may be six or more or less in number, which knives are arranged to turn the dirt toward the longitudinal center of the machine. The forward portion of the implement is shown supported by wheels 23, preferably conical, and these wheels are mounted upon an axle 24. The axle 24 is journaled in arms 25, fulcrumed upon the main frame, as shown in Fig. 1, and these arms extend rearward near to the handles 25$^a$ at the rear of the implement. Levers 26 are fulcrumed on the arms 25 near their handle or rear ends, and these levers are connected with pawls 27, as shown in Fig. 1, the pawls being adapted for engagement with forwardly-curved racks 28, secured to the frame of the implement, so that the forward end of the implement may be rendered high or low by the adjustment of the said arms 25. The pulverizing device is shown in detail in Figs. 3, 4, 5, 6, and 7 and is shown in position on the implement in Figs. 1 and 2.

In the construction of the preferred form of the pulverizing device two hubs 29 are employed, each hub being provided with segmental sections 30, attached to and held a desired distance from the periphery of the hubs, and spaces 31 intervene between the said segmental peripheral sections 30, as is clearly shown in Fig. 3. This pulverizing device in its entirety is designated as C on the drawings. In addition to the sections, each section comprising a hub and segmental members 30, as above described, longitudinal plates 32 are employed, which plates enter the spaces 31 and are flush with the outer faces of the segmental members 30, as is shown in Fig. 6. Each plate 32, however, is provided at its center with a segmental head 33, arched in cross-section, and this arched portion 33 of each plate 32 is at right angles to the longitudinal axis of the plates. The said arched sections of the plates 32 are located between the inner edges of the segmental members 30, connected with the hubs 29, as is shown in Figs. 4 and 5. The hub-sections of the pulverizing device are held connected by bolts 34, passed through suitable openings in the segmental members 30 of the hub-sections, as is shown in Fig. 5, and bands 35 are passed around the segmental members 30, as is shown in Fig. 6, which bands serve to hold the plates 32 in position. I desire it to be understood that knives tending to throw the dirt inward and similar to the knives 19$^a$ may be secured to the segmental members 30 of the hub of the pulverizer at the openings between said members, in which event the strap 35 is removed or modified. The arched portions 33 of the plates 32 are of such length that spaces 33$^a$ intervene between the opposing ends of such parts when the plates 32 have been secured in position on the hub-sections of the pulverizer. The openings 33$^a$ between the ends of the arched members 33 of the plates 32 alternate with the openings 31 intervening between the segmental members 30 of the hub-sections of the pulverizer, as is also shown in Fig. 4. The hubs of the pulverizer are mounted to turn on a fixed axle 36, and this axle is provided at the central portion of the pulverizer within the same with a slot 37, in which slot the shank 38 of a paddle 39 is adjustably secured by means of a set-screw or its equivalents, and the said paddle 39 is of circular formation, as is shown in Fig. 6, and loosely enters the arched parts 33 of the plate members 32 of the pulverizer. The axle 36 is secured at its ends in hangers 40, and these hangers are shown as attached to the toothed portion of the toothed frame B in any suitable or approved manner in advance of the main cultivator-shanks 18. Braces 41 are attached to the ends of the fixed axle 36, which braces extend rearward and are shown as attached to the toothed section of the foremost rear cross-bar 15 of the toothed frame B, as is shown in Fig. 2. Under this construction it will be observed that the growing plants, as well as the earth, will be pressed down by the arched portions 33 of the roller or pulverizer as the said roller or pulverizer revolves by contact with the ground, and any clods or earth choking or encumbering the slots in the roller or pulverizer will be forced out of the way when they come in contact or meet with the paddle 39 and will find their way down to a lower opening at the periphery or end of the roller or pulverizer.

In Fig. 7 I have shown a slightly-modified form of the roller or pulverizer, (designated as C'.) Under this construction the plates 32 and their arched parts 33 are omitted, and the hub-sections 29 are brought quite close together or as near as possible to the shank of the paddle 39. Under the construction shown in Figs. 4, 5, and 6 the outer ends of the bolts 34 pass through plates 42, which are so constructed as to afford means of attachment for disk knives or blades, which may be made to pass diagonally and circumferentially on the outside of the roller or pulverizer C, whereas under the construction shown in Fig. 7 these plates are omitted; but the hub-sections are connected by bolts 34$^a$. The segmental members of the hub-sections in the modified form are designated as 30$^a$ and the hubs as 29$^a$, while the paddle is designated as 39$^a$ and its shank as 38$^a$.

Under both forms of construction the ends of the pulverizer are sufficiently open for the earth that has been disengaged by the paddle to find its way out either through the ends of the pulverizer or through one of the lower openings.

Having thus described my invention, I claim as new and desire to secure by Letters Patent—

1. In agricultural implements, a pulverizer, consisting of hub-sections mounted to revolve upon a shaft, each hub-section comprising a hub and spaced segmental members attached to the outer faces of the hub, means, substantially as described, for connecting the hub-sections, and a paddle stationarily held within the pulverizer between the hub-sections, as and for the purpose specified.

2. In agricultural implements, a pulverizer consisting of opposing hub-sections, each hub-section comprising a hub and segmental members connected with the outer faces of the hubs, an arched section intervening between the hub-sections, the arched section having openings therein, a fixed shaft on which the hub-sections are mounted to turn, and a paddle carried by the said shaft and extending within the arched portion of the pulverizer, for the purpose set forth.

3. In agricultural implements, the combination, with opposing hub-sections, each hub-section comprising a hub and segmental plates attached to the outer face of the hubs, spaces intervening between the opposing ends of the segmental plates, means, substantially as described, for connecting the hub-sections, and a fixed shaft on which the hub-sections are mounted to turn, of plates which enter the spaces between the segmental members of the hub-sections; each plate being provided with an arched member at right angles to the plate, which arched members are located between the opposing edges of the hub-sections, and a paddle secured to the said shaft, entering the arched members of the plates and conforming to the contour of the said arched members, as and for the purpose specified.

4. In agricultural implements, a pulverizer consisting of opposing hub-sections, each section comprising a hub, and segmental members secured to the outer faces of the hubs, spaces intervening between the opposing ends of the said segmental members, a fixed shaft upon which the hub-sections turn, plates closing the periphery of the outer ends of the hub-sections, fastening devices passed through the closing-plates and through the segmental members of the hub-sections, longitudinal plates which enter and fill the openings intervening between the segmental members of the hub-sections, each longitudinal plate being provided with an arched central member, extending transversely of the plates, the arched members of the longitudinal plates being located between the hub-sections, the arched members of the longitudinal plates being so constructed that spaces intervene between them, which spaces are in communication with the interior of the pulverizer, a fixed shaft on which the hub-sections revolve, and a paddle secured to the said shaft, extending and loosely fitting in the arched members of the longitudinal plates, for the purpose set forth.

In testimony whereof I have signed my name to this specification in the presence of two subscribing witnesses.

JESSE RUBLE JONES.

Witnesses:
O. J. WAITE,
REUBEN T. CLARK.